United States Patent Office 2,929,389
Patented Mar. 22, 1960

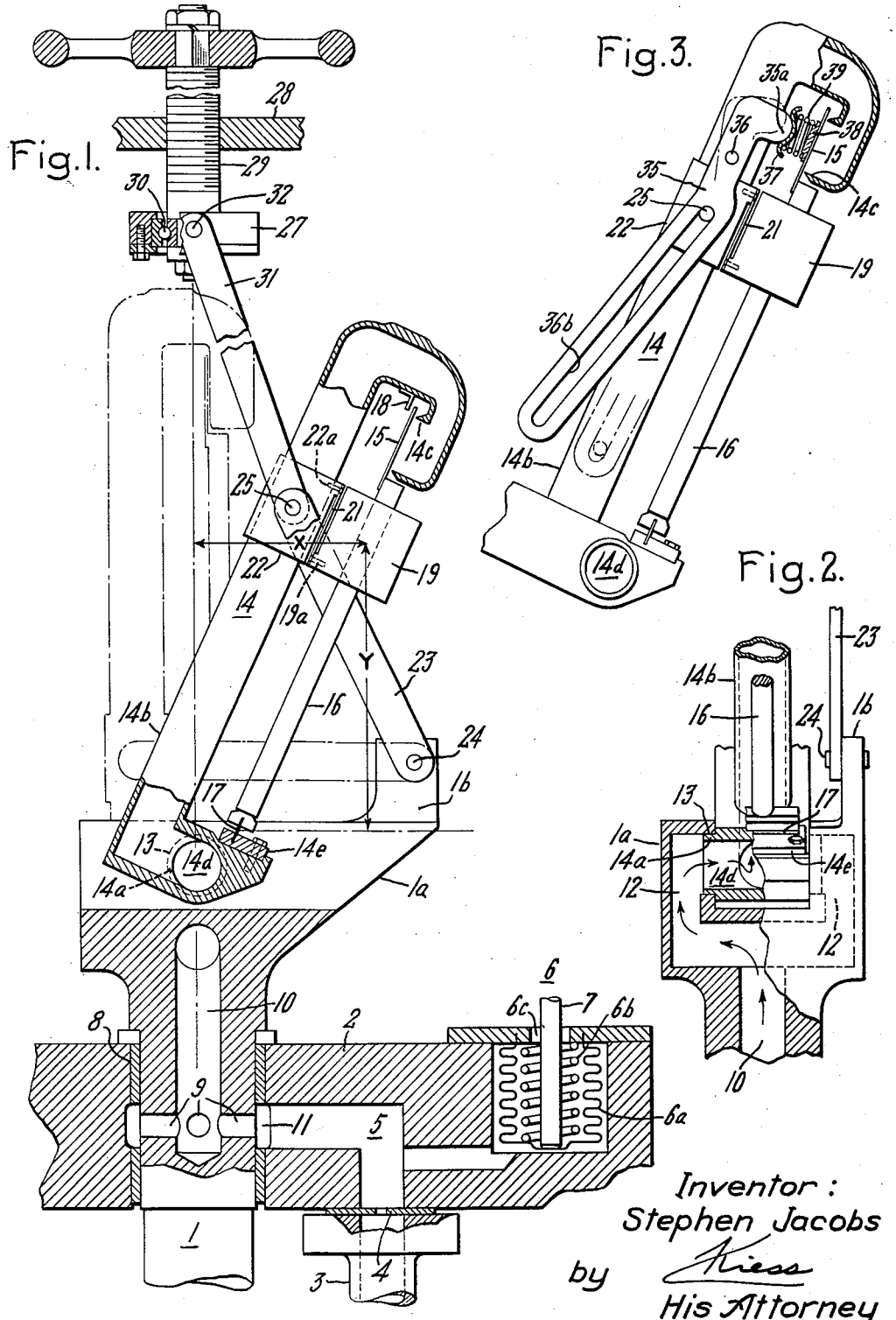

2,929,389

GOVERNING MECHANISM

Stephen Jacobs, Fitchburg, Mass., assignor to General Electric Company, a corporation of New York Application March 27, 1959, Serial No. 802,506

5 Claims. (Cl. 137—56)

This invention relates to centrifugal governing mechanisms which employ fluid pressure variations to effect speed control and more particularly to an improved centrifugal governor which provides effective regulation over a wide range of speeds.

In centrifugal governors, one of the characteristics which limits the capacity of the governor to provide effective regulation over a wide speed range is the variation of the force exerted by the centrifugal weights with the speed of the governor. As is commonly known, this force varies as the square of the speed of rotation. Therefore, when the governor is operating in a speed range at approximately 10% of its normal operating range, a differential change in speed will produce a differential change in the centrifugal force of only approximately 1% of that which would be produced if the governor were operating at normal speed. Since the force output of the governor is often utilized to control the prime mover through an intervening pilot valve and associated hydraulic system, the variation of the differential force changes produced by the governor on the pilot valve at different speed ranges becomes of serious consequence.

In attempting to design a single governor which will provide proper regulation at a wide variety of speed levels, it will be seen that unless compensation is made for the various speed levels at which the governor will be operating, a compromise will have to be drawn between over-sensitivity at high speeds on the one hand and under-sensitivity at low speeds on the other hand.

Accordingly, it is an object of the present invention to provide an improved governor which will perform effectively with optimum control capabilities over a wide range of speed levels.

Another object is to provide an improved governing mechanism which can be adjusted while the governor is operating to provide for the different speed levels at which the governor performs its regulating functions.

A still further object is to provide a novel and compact design for a centrifugal governor which utilizes fluid pressure variations to effect speed regulation.

Generally stated, the invention is practiced by providing a rotating spindle carrying pressurized fluid in an internal conduit. A second member attached to rotate with the spindle provides a support for a centrifugal flyweight and also contains a fluid conduit connecting with the conduit in the spindle. A bleed valve is located at the end of this second conduit and the flyweight is arranged so that a slight movement of the flyweight with respect to the second member will cause the bleed valve to open and close to vary the amount of fluid bled from the conduit. Means are provided to alter the point of support for the flyweight so that the radius of rotation of the flyweight with respect to the spindle axis and the lever arm through which the flyweight acts may both be varied. The pressure variations caused by the opening and closing of the bleed valve are converted to a controlling movement through a conventional fluid relay system.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

Fig. 1 is an elevation drawing, partly in section, showing the governing mechanism and associated hydraulic control system;

Fig. 2 is a view, partly in section, of a portion of Fig. 1; and

Fig. 3 is a modification of the device shown in Fig. 1.

Referring now to Fig. 1 of the drawing, governor spindle 1 is mounted for rotation in a suitable stationary support member 2. A source of oil under pressure (not shown) supplies high pressure oil (for instance on the order of 50 to 100 p.s.i.) by means of conduit 3 and orifice plate 4 to internal conduit 5 in the support 2. Conduit 5 supplies oil to a transducer device 6 for converting fluid pressure changes into a mechanical movement of the output member 7. While transducer 6 may be any one of several types, here it is shown as a flexible bellows 6a biased by a spring 6b and open to the atmosphere by means of aperture 6c. It is understood that the movement of output member 7 will be used to control the speed of the prime mover and the precise means for accomplishing this are not shown, such a showing being unnecessary to an understanding of the present invention. An example of such a system may be seen in Patent No. 2,811,837, issued to M. A. Eggenberger on November 5, 1957 and assigned to the assignee of the present application. Note that for each position of transducer 6 there is a different pressure and that this pressure will act on the area of disk 15 requiring a different force to be exerted by weight 19.

Spindle 1 is mounted for rotation in bushings 8 and is held against axial movement by a suitable thrust bearing (not shown). Spindle 1 is also provided with internal radial and axial conduits 9, 10 respectively which receive oil from annular groove 11 while spindle 1 is rotating. Spindle 1 is, of course, connected by suitable gearing (not shown) to the prime mover whose speed is being controlled by the governor, so that it will rotate in bushings 8 at a speed proportional to the prime mover shaft speed.

The top end of the spindle consists of a bifurcated carriage portion 1a, another view of which may be seen by reference to Fig. 2. The carriage portion 1a is provided with internal branch conduits 12 which discharge from opposing circular openings 13 cut in the inwardly facing surfaces of carriage 1a. Circular openings 13 act both to supply fluid and as a bearing seat, as will be described.

An adjustable radius arm, shown generally as 14, is mounted on carriage 1a to pivot in openings 13 by means of cylindrical extensions 14a which extend for a distance into openings 13 to define a conduit 14d. A central tube 14b, which is connected to receive oil from conduit 14d, extends upwardly, bending through approximately 270° to form a terminal discharge opening 14c. Thus by means of conduit 5, 9, 10, 12, 14d, and 14b, the pressurized fluid supplied to the governor will be transmitted to the discharge opening 14c while spindle 1 is rotating no matter what angle tube 14b has assumed around its pivot point in openings 13.

In order to control the flow of oil from discharge opening 14c, a disk 15 mounted on rod 16 is free to pivot about a resilient pivot member 17. Member 17 may consist, for example, of a small piece of spring metal mounted in slots for this purpose in the bottom of rod 16 and in an extension piece 14e on radius arm 14. A stop 18 prevents disk 15 from opening too far. Thus disk 15, acting in conjunction with the discharge opening 14c, acts as a variable bleed valve and slight movement of rod 16 toward or away from tube 14b on pivot 17 will control the amount of fluid discharged from opening 14c and consequently the pressure in conduit 5. It will be apparent that, since pivot 17 is mounted on radius arm 14, the movement of disk 15 relative to opening 14c will be unaffected by the position assumed by the radius arm as it is pivoted in the openings 13, with the exception of minor variations due to centrifugal force on the fluid itself.

The control over the amount of opening afforded by disk 15 is determined by the movements of centrifugal flyweight 19 which is mounted to slide easily on rod 16. Flyweight 19 is suspended in position on rod 16 by a suitable flexible strap 21 attached to the bottom of flyweight 19 as seen at 19a. A collar 22 which is mounted to slide easily along tube 14b supports the other end of flexible strap 21 as shown at 22a. Thus the axial position of collar 22 along tube 14b determines the axial position of flyweight 19 along rod 16. On the other hand, although flyweight 19 is suspended at a given local position on rod 16, it will be free to swing in or out transversely from tube 14b by virtue of the flexible strap 21 which supports it. Transverse movement of flyweight 19 relative to tube 14b controls the opening or closing of the bleed valve through disk 15.

Also attached to carriage 1a is an extension 1b to which is connected link 23 by means of a pinned connection 24. The other end of link 23 is connected to collar 22 by pinned connection 25. Therefore, as collar 22 is moved axially along tube 14b, link 23 causes the radius arm 14 to pivot in the openings 13.

Pivoting the radius arm 14 affects the degree of influence of flyweight 19 on the opening or closing of disk 15 in two ways. First, by moving flyweight 19 in the direction of disk 15, it changes the mechanical advantage enjoyed by flyweight 19 pivoting on point 17 against the countervailing pressure exerted by the fluid against disk 15. Secondly, by constraining the radius arm 14 to tilt or pivot outwardly, the effective radius of rotation of flyweight 19 from the axis of rotation of spindle 1 is changed. It can be shown mathematically that if Y is the vertical distance from pivot point 17 to the center of gravity of flyweight 19 and X the horizontal distance from the axis of spindle 1 to the center of gravity of flyweight 19, and N the rotational speed of the governor spindle 1, the force opposing the fluid pressure on disk 15 will be proportional to the product $XYN^2$. Adjustment of radius arm 14 may be made to compensate for changes in the speed level, N, at which the governor is operating. If the force or the pressure level acting against disk 15 is maintained constant, then the speed N must be proportional to $$\frac{1}{\sqrt{XY}}$$

Therefore, the force exerted on disk 15 by weight 19, at various speed settings, may be made constant by changing X and Y. That is to say, although variations in speed within a given speed range will cause the opening and closing of the bleed valve for steady state control, the tilting of radius arm 14 is employed to provide similar opening and closing characteristics over a wide range of speed settings.

Radius arm 14 is tilted by means of a rotating trunnion support 27 supported in a bracket 28 above the governor. An adjusting screw 29 which is threaded into bracket 28 supports an anti-friction bearing 30, the outer race of which carries connecting rods 31 on pivot pins 32. Connecting rods 31 are attached to the pinned connection 25 so that raising the trunnion support 27 by means of screw 29 will result in also raising collar 22 on tube 14b to increase the angle of tilt in radius arm 14. The frictionless bearing 30 and the pins 32 allow this adjustment in the position of radius arm 14 to be made while spindle 1 is rotating without interfering with the operation of the governor. It will be apparent that other devices could be used to raise and lower collar 22 on tube 14b in place of the trunnion support 27, which is shown in simple diagrammatic form.

In Fig. 3 is shown a modification which can be used on my improved governor in order to achieve varying degrees of "speed droop" or "speed regulation" at different positions of radius arm 14. It will be realized that it is often desirable to have a greater speed regulation or speed droop at low speeds to insure stable governing. This is especially true for very large speed ranges. Further, it may be desirable to reduce the total variation XY to avoid extreme adjustments while still retaining the principal advantages of this arrangement. To accomplish this, the radius arm 14 is altered as shown in Fig. 3 to provide an additional force on disk 15. A spring compression lever 35 is attached to tube 14b by a pinned connection 36 and arranged so that upward movement of collar 22 on conduit 14b will move spring compression lever 35 clockwise with respect to conduit 14b. This is shown diagrammatically by providing a cam surface 36b on spring compression lever 35 which is actuated by pin connection 25 so that clockwise movement of lever 35 will take place as collar 22 rises. Lever 35 also carries a projection 35a which exerts a pressure on spring retaining ring 37. Another spring retaining ring 38 is attached to disk 15 and a compression spring 39 is held in place between retaining rings 37, 38.

As has been previously explained, the force exerted by centrifugal flyweight 19 against the opposing fluid pressure on disk 15 is a function of the distances X and Y. With the arrangement of Fig. 3, centrifugal flyweight 19 is aided by the force exerted by compression spring 39. Since this compressive force is determined by the position of projection 35a on spring compression lever 35, which in turn is affected by the axial location of collar 22 on member 14b, it will be seen that the force exerted on disk 15 by flyweight 19 is supplemented by a force which varies as a function of Y.

By the addition of compression spring 39, the equilibrium position maintained by disk 15 against the oil pressure will be maintained partly by the force exerted by spring 39 and partly by the force exerted by flyweight 19. However, since a very slight movement of disk 15 is necessary to effect a change in fluid pressure, the effect of the spring constant of spring 39 will not add appreciably to the speed droop or regulation at any one speed setting. The net effect will be substantially as though the oil pressure on disk 15 were opposed by a constant force supplemented by the varying force of the flyweight. Moving the radius arm 14 to a more tilted position for regulation in a lower speed range increases the proportion of force supplied by compression spring 39 to the total amount of force required to hold disk 15 in equilibrium against the fluid pressure. Since a smaller proportion of the total force on disk 15 is supplied centrifugally, a larger fraction or percentage of the centrifugal force is required to effect a change in force from flyweight 19, required to produce a movement of disk 15 comparable to that of the previous setting. Therefore, greater changes in governor speed are required to provide control of output member 7 and hence less sensitivity or greater "speed regulation" (i.e. change in speed as a function of load) has been achieved at the lower speed range. In practice, it appears that it is preferable to make the "speed regulation" at minimum speed perhaps double that occurring at maximum speed.

In operation, setting of this long range governor to the desired speed is effected by rotating screw 29, which is connected through suitable gearing to a speed indicator dial (not shown), for a given calibrated speed setting. Rotation of screw 29 raises the rotating trunnion pins 32 and connecting arms 31, which in turn raise collar 22 and flyweight 19 on tube 14b, rod 16, respectively. Link 23 constrains radius arm 14 to tilt as collar 22 is raised, establishing an equilibrium position where the flyweight 19 is located by distances X and Y as shown in Fig. 1. High pressure oil entering through conduit 3 and orifice 4 is maintained at a substantially fixed pressure in conduit 5. The governor has been calibrated so that rotation of spindle 1 by the shaft at a given speed causes flyweight 19 acting on disk 15 to just maintain the proper pressure in conduit 5 to hold output member 7 in a neutral or "steady state" position. Therefore, increase or decrease in the speed of spindle 1 will slightly increase or decrease pressure in conduit 5 by means of the bleed valve thereby causing output member 7 to rise or descend to effect control of the prime mover. Change to a different speed is, of course, made simply by rotating screw 29 to a new position.

By use of the improved governing mechanism shown, effective and accurate governing can be obtained over a very wide range of speeds without deleterious effects on the operating characteristics of the governor. By changing both the lever arm through which the flyweight operates and the effective radius of the flyweight from the axis of rotation, an extreme change can be produced in the effect of flyweight 19. Such an extreme change is necessary to compensate for the effect due to the square function of spindle rotation on the force exerted by the flyweight.

While there has been described what is at present considered to be the preferred embodiment of the invention, it will be understood that various modifications may be made therein and it is intended to cover in the appended claims all such modifications as fall within the true spirit and scope of this invention.

What I claim as new and desire to secure by Letters Patent of the United States is:

1. A centrifugal governor for operation over a wide range of speeds comprising rotatable spindle means including first conduit means connected to receive operating fluid under pressure while the spindle means rotates, a source of fluid under pressure connected to supply said first conduit means, adjustable radius arm means disposed on said spindle and including second conduit means connected to receive fluid from said first conduit means, centrifugal flyweight means mounted on said radius arm for relative movement with respect to said radius arm means, bleed valve means disposed on the radius arm means connected to discharge variable quantities of fluid from said second conduit means and positioned by movement of the centrifugal flyweight means relative to the radius arm means under the influence of centrifugal force, and means to adjust the distance of the centrifugal flyweight means from the axis of spindle rotation.

2. A centrifugal governor for operation over a wide range of speeds comprising rotatable spindle means including first conduit means for conducting fluid while the spindle means rotates, a source of operating fluid under pressure connected to supply said first conduit means, radius arm means pivotally connected to said spindle means and including second conduit means connected to receive fluid from said first conduit means, bleed valve means mounted on said radius arm means to control the quantity of fluid discharged from said second conduit means, centrifugal flyweight means movably disposed on said radius arm means for relative movement with respect to the radius arm means under the influence of centrifugal force and connected to position said bleed valve means in response to changes in speed of said spindle means, and means to vary the distance of said flyweight means from the rotational axis of said spindle means.

3. A centrifugal governor for operation over a wide range of speeds comprising rotatable spindle means including first conduit means for conducting fluid while the spindle means rotates, a source of operating fluid connected to supply said first conduit means at a fixed pressure, radius arm means pivotally connected to said spindle means to rotate therewith and including second conduit means connected to receive fluid from said first conduit means, bleed valve means mounted on the radius arm to control the quantity of the discharge of fluid from said second conduit means, collar means slidably disposed on said radius arm means, link means connecting said collar means and said spindle means whereby movement of the collar means along the radius arm means will constrain the radius arm means to pivot on the spindle means, centrifugal flyweight means supported from said collar means for limited movement relative thereto and connected to position said bleed valve means, and means to adjust the position of the collar means on the radius arm means while the spindle means is rotating.

4. A centrifugal governor for operation over a wide range of speeds comprising rotatable spindle means including first conduit means for conducting fluid while the spindle means rotates, a source of operating fluid under pressure connected to supply said first conduit means with fluid at a fixed pressure, radius arm means pivotally connected to said spindle means and including second conduit means connected to receive fluid from said first conduit means, bleed valve means mounted on the radius arm to regulate the quantity of the discharge of fluid from said second conduit means, collar means slidably disposed on said radius arm means, link means connecting said collar means to said spindle means whereby movement of the collar means along the radius arm means will constrain the radius arm means to pivot on the spindle means, centrifugal flyweight means mounted on said collar means for limited movement with respect to the collar means, lever means fulcrumed on the radius arm means to position the bleed valve means and actuated by the relative movement between the collar means and the flyweight means, and means to effect displacement of the collar means on the radius arm means while the spindle means rotates, whereby the effective radius of the flyweight means and the effect of said lever means on the bleed valve means may be altered simultaneously by displacement of said collar means.

5. A centrifugal governor for operation over a wide range of speeds comprising rotatable spindle means including first conduit means for conducting fluid while the spindle means rotates, a source of operating fluid under pressure connected to supply said first conduit means with fluid at a fixed pressure, radius arm means pivotally connected to said spindle means and including second conduit means connected to receive fluid from said first conduit means, bleed valve means mounted on the radius arm to regulate the quantity of the discharge of fluid from said second conduit means, collar means slidably disposed on said radius arm means, link means connecting said collar means to said spindle means whereby movement of the collar means along the radius arm means will constrain the radius arm means to pivot on the spindle means, centrifugal flyweight means mounted on said collar means for limited movement with respect to the collar means, lever means fulcrumed on the radius arm means to position the bleed valve means and actuated by the relative movement between the collar means and the flyweight means, means to effect displacement of the collar means on the radius arm means while the spindle means rotates to simultaneously alter the effective radius of the flyweight means and the effect of said lever means on the bleed valve means, spring biasing means acting on the bleed valve in the same direction as said centrifugal flyweight means, and means automatically adjusting the force exerted by said spring biasing means as a function of displacement of the collar means on the radius arm means.

No references cited.